(12) United States Patent
Williams et al.

(10) Patent No.: US 7,100,441 B2
(45) Date of Patent: Sep. 5, 2006

(54) METHOD AND APPARATUS FOR MONITORING LIQUID LEVELS WITHIN A VESSEL

(75) Inventors: Graham Williams, Cheshire (GB); Raj Odedra, Cheshire (GB); Hugh Cunning, Cheshire (GB); Lindsay Smith, Coventry (GB)

(73) Assignee: Epichem Limited, Wirral (GB)

( * ) Notice: Subject to any disclaimer, the term of this patent is extended or adjusted under 35 U.S.C. 154(b) by 0 days.

(21) Appl. No.: 10/521,473

(22) PCT Filed: Jun. 26, 2003

(86) PCT No.: PCT/GB03/02761

§ 371 (c)(1),
(2), (4) Date: Jan. 18, 2005

(87) PCT Pub. No.: WO2004/008085

PCT Pub. Date: Jan. 22, 2004

(65) Prior Publication Data

US 2005/0247125 A1    Nov. 10, 2005

(30) Foreign Application Priority Data

Jul. 17, 2002  (GB) .................... 0216502.5
Oct. 7, 2002   (GB) .................... 0223154.6

(51) Int. Cl.
*G01F 23/26* (2006.01)

(52) U.S. Cl. .................... 73/304 C

(58) Field of Classification Search .................... None
See application file for complete search history.

(56) References Cited

U.S. PATENT DOCUMENTS 3,831,069 A    8/1974    Merrell et al.
3,935,740 A *  2/1976    Whitney .................... 73/304 C
4,010,650 A    3/1977    Piatkowski
4,448,072 A *  5/1984    Tward ....................... 73/304 C
4,449,405 A *  5/1984    Franz et al. ............... 73/304 C
4,809,129 A *  2/1989    Hansen et al. ............. 361/284
4,859,375 A    8/1989    Fletcher et al.
4,966,207 A * 10/1990    Howard et al. .............. 141/98
5,031,068 A    7/1991    Hansen, III et al.
5,701,084 A   12/1997    Borthwick, Jr. et al.
5,961,360 A * 10/1999    Nishimura et al. ........... 445/24
6,029,717 A    2/2000    Siegele et al.

(Continued)

FOREIGN PATENT DOCUMENTS

EP    1 006 219 A    6/2000

(Continued)

OTHER PUBLICATIONS

EPO, International Search Report for International Application No. PCT/GB2003/002761, Oct. 31, 2003.

(Continued)

*Primary Examiner*—Daniel S. Larkin
*Assistant Examiner*—Paul M. West
(74) *Attorney, Agent, or Firm*—Thompson Coburn LLP

(57) ABSTRACT

An apparatus for monitoring the level of a liquid in a vessel comprises at least one metallic probe hermetically sealed within the vessel, the probe having a sealing end and at least a portion of the probe constituting a first electrode, the sealing end of the probe being encased within a glass material, a second electrode spaced apart from said first electrode in a manner such that the first and second electrode together form part of a capacitor, a mechanism for supplying an electrical current from an applied electrical current source to the capacitor, and a mechanism for monitoring capacitance of the capacitor.

18 Claims, 6 Drawing Sheets

U.S. PATENT DOCUMENTS 6,078,729 A 6/2000 Kopel
6,148,681 A 11/2000 Gravel et al.
6,341,615 B1 * 1/2002 Zorich et al. ................. 137/14

FOREIGN PATENT DOCUMENTS

| EP | 0650048 A1 | 7/2000 |
| GB | 2081450 A | 2/1982 |
| GB | 2212272 A | 7/1989 |
| JP | 2000128181 | 5/2000 |

OTHER PUBLICATIONS

British Search Report dated Jun. 3, 2003, for Application No. GB 0223154.6, 1 page.

* cited by examiner

METHOD AND APPARATUS FOR MONITORING LIQUID LEVELS WITHIN A VESSEL

The present invention relates to the field of measuring probes, particularly but not exclusively a probe for monitoring the level of a reactive liquid, such as a metalorganic compound, within a vessel.

Thin films of metal are fabricated upon solid substrates for use in the electronics and opto-electronics industries by a process known as Metal Organic Chemical Vapour Deposition (MOCVD). The metal precursors are generally delivered to a substrate by means of a bubbler. A bubbler containing the metal precursor material has an inlet pipe, a dip-tube and an outlet pipe. Carrier gas, such as hydrogen, helium or nitrogen, is introduced into the vessel through the inlet pipe and delivered to the bottom of the vessel though the dip-tube. The gas is able to pick up some of the vapours of the metal precursor before leaving the bubbler via the outlet pipe. The gas transports the precursor vapour to a reactor site where the precursor is decomposed to provide a deposit of the metal on a solid substrate.

The amount of precursor material in the bubbler is constantly changing with use of the apparatus. Conventional probes cannot be used due to the organometallic compounds attacking the probe. This would also lead to contamination of the precursor. The volume of precursor in the bubbler may be measured using single point measurements for high and low fill levels based on an optical system. However, this utilizes a glass tube which may break causing contamination of the contents of the bubbler. Alternatively, the bubbler may be provided without an accurate level indicator, being changed either when a drop in performance is seen or using a calculated figure based on usage time under particular conditions. This can lead to early replacement of the bubbler when potentially another 10% of material in the bubbler could be used.

Clearly it would be desirable to provide an accurate probe for monitoring the level of organometallic precursor contained within a bubbler. However, problems arise with the provision of a suitable probe that has the necessary robustness and compatibility with the organometallic compounds with which it comes into contact. In this respect, the probe must not react with the chemicals contained within the vessel to ensure high purity metal deposits are achieved. Additionally, it should not impair the airtight seal of the bubbler since the contents are air-sensitive and the pressure within the vessel should be maintained.

It is an object of the present invention to provide a method of continuously monitoring the level of a reactive liquid in a vessel, particularly but not exclusively the level of a metalorganic compound, which aims to overcome, or at least alleviate, the abovementioned drawbacks.

A further object of the present invention is to provide an apparatus for continuously monitoring the level of a liquid in a vessel, particularly but not exclusively an metalorganic compound, that aims to overcome, or at least alleviate, the abovementioned drawbacks.

Accordingly a first aspect of the present invention provides a method for monitoring the level of an organo metallic compound in a vessel, the method comprising the steps of inserting at least one metallic probe into a vessel to act as a first electrode, one end of the probe being encased in a glass material, hermetically sealing the end of the probe encased in a glass material within the vessel, providing a further electrode spaced apart from the first electrode to form a capacitor, applying an electric current to the capacitor and monitoring the capacitance thereof.

A second aspect of the present invention provides an apparatus for monitoring the level of a liquid in a vessel, the apparatus comprising at least one metallic probe hermetically sealed within the vessel to act as a first electrode, the sealing end of the probe being encased within a glass material, a second electrode spaced apart from said first electrode to form a capacitor, means for applying an electric current to the capacitor and means for monitoring the capacitance thereof.

It is to be appreciated that the two spaced apart electrodes are provided in order to set up the necessary dielectric therebetween. The capacitance of the capacitor thus formed will vary with the amount of liquid between the probes thereby enabling the level of liquid within the vessel to be monitored.

Preferably the vessel itself is a metallic container, for example being of stainless steel, and acts as the second electrode. Alternatively, two parallel probes could be sealed within the apparatus to act as the first and second electrodes respectively.

The metallic probe that is inserted into the vessel may be in the form of a rod, a flat elongated plate or tube. The probe may be hollow or solid. Preferably the probe is made of stainless steel.

The probe according to the present invention is particularly suitable for use in monitoring levels of metalorganic compounds.

The probe is preferably attached to a port at the top of a vessel, the vessel generally being in the form of a bubbler, that contains an inlet and an outlet pipe. One end of the probe is encased within a glass material and this is hermetically sealed within the port. More preferably, the probe is sealed within a mounting or cap that is inserted into the port of the vessel. Preferably, the mounting is provided with electrical connections for the probe, for example in the form of a bayonet type connector, such as a BNC connector.

A coating, for example of an elastomeric material such as Teflon™, may be applied over at least a part of the probe that extends from the seal.

More preferably, at least the part of the probe that is encased in the glass material to form a metal to glass seal comprises a nickel alloy, more preferably being typically 70% nickel. More preferably, the alloy is made precipitation hardenable by the additions of aluminium and/or titanium thereto. Suitable alloys include those sold under the trade names INCONEL® X-750™, INCONEL® 600™ or KOVAR®. More preferably, an INCONEL®X-750™ alloy is used. The glass that is sealed around this part of the probe is preferably a borosilicate glass. It is preferable for the probe to be sealed to the glass by such a matched seal.

The glass material may then be sealed within the mounting. The mounting is preferably comprised of a nickel alloy, such as Inconel® X-750™. The mounting preferably incorporates a gasket face seal filling, such as a VCR profile at a connecting face and internal faces to suit the fit of an electrical connector and the glass-to-metal hermetic seal. The gasket is preferably one which is deformed on tightening to provide a secure metal-metal seal. The electrical connector is preferably surrounded by a layer of insulating material, such as a polyether ether ketone (PEEK).

Conventional means may be provided for applying an AC or DC source to the probe, together with monitoring means, such as a capacitance meter, for measuring a change in capacitance. Preferably, a recorder is also provided for recording the change in capacitance. The recorder may include display means, such as a liquid crystal display. It is preferable for the capacitance to be continuously monitored thereby providing a continuous reading of the level of liquid in the vessel.

Preferably, the apparatus includes means for calibration of the system whereby a particular capacitance corresponds to a particular volume of liquid within the vessel. For example, the recording means could be set at a value of "0" for a capacitance recorded for an empty vessel and could be set "100" for the capacitance recorded for a full vessel. Preferably, the apparatus is calibrated to respond to particular characteristics of the liquid contained within the vessel. Additionally, the apparatus may be adapted to provide the rate of removal or addition of the liquid to the vessel.

In a preferred embodiment of the present invention there is provided a bubbler containing an metalorganic compound, the bubbler comprising a sealed metallic container having an inlet pipe, an outlet pipe and a dip-tube and further comprising a metallic probe hermetically sealed within the container, the sealing end of the probe being encased in a glass material, the container and the probe forming a capacitor, means for applying an electric current to the capacitor and monitoring means for measuring the capacitance thereof.

It is to be appreciated that the metallic probe may be hermetically sealed within the bubbler as hereinbefore described.

For a better understanding of the present invention and to show more clearly how it may be carried into effect reference will now be made to the following Examples in which Example 1 investigates the use of an apparatus according to one embodiment of the present invention in measuring the changing level of trimethylgallium (TMG) in a bubbler, Example 2 investigates the use of the same apparatus in measuring the changing level of trimethylaluminium (TMA) in a bubbler, Example 3 investigates the use of an apparatus according to another embodiment of the present invention in measuring the changing level of TMA in a bubbler and Example 4 investigates the use of the same apparatus in measuring the changing level of TMG in a bubbler, and with reference to the accompanying drawings in which:

Figures 1, 2:
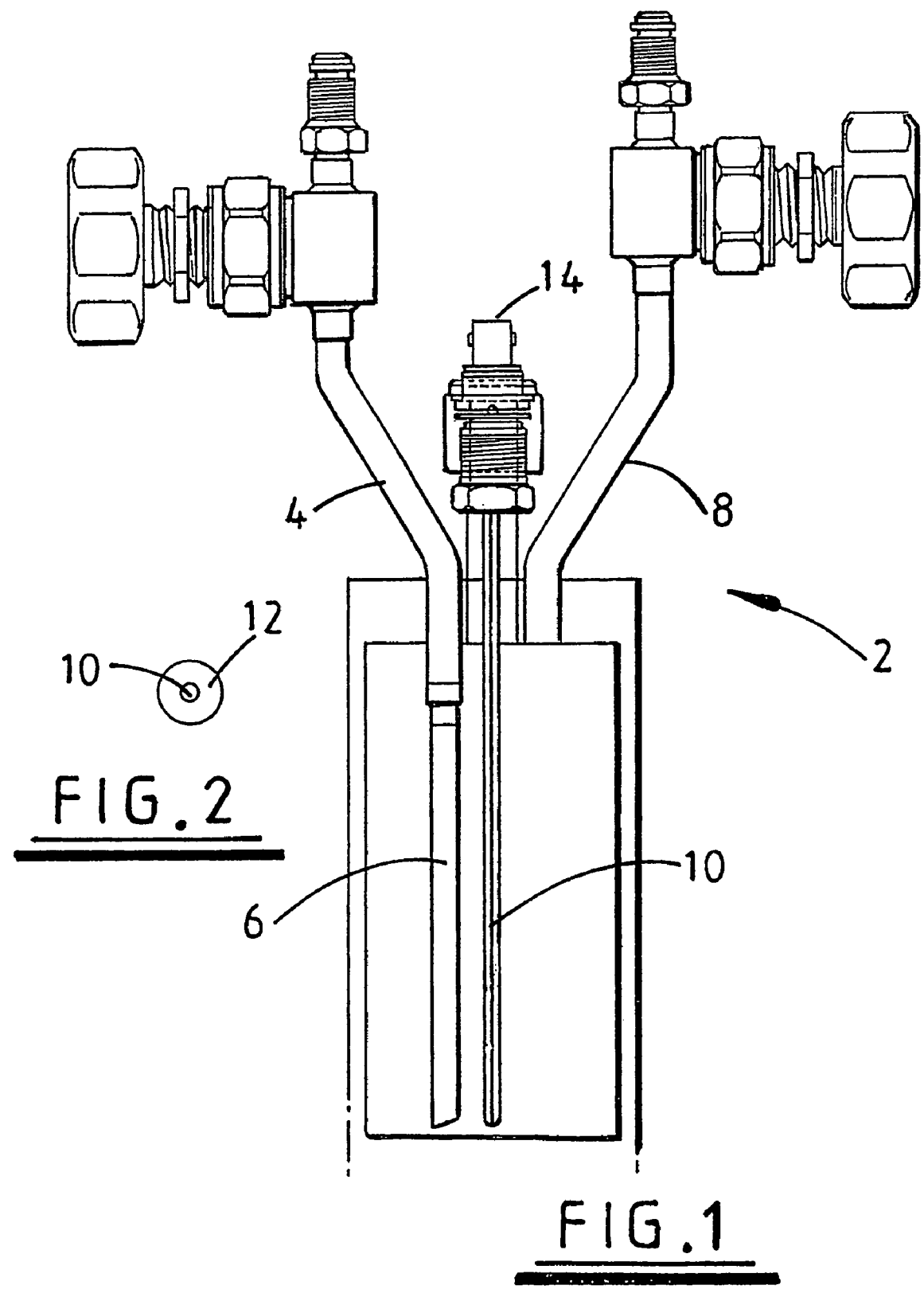
FIG. 1 is a schematic diagram of an apparatus fitted with a probe according to one embodiment of the present invention.
FIG. 2 is a cross-sectional view through the probe contained in the apparatus of FIG. 1.

Referring to FIGS. 1 and 2 of the accompanying drawings, an apparatus for continuously monitoring the level of a metalorganic compound in a vessel, such as a bubbler, according to a first embodiment of the present invention is illustrated. The bubbler 2 has an inlet pipe 4 leading into a dip pipe 6 and an outlet pipe 8. A metal probe 10 is provided which extends through the centre and length of the bubbler vessel. The upper end of the probe is encapsulated in a layer of glass 12 and hermetically sealed to the top of the bubbler to ensure that the pressure within the bubbler is maintained and that the contents of the bubbler are isolated from air. The lower end of the probe that dips into the precursor contained within the vessel is coated with an inert, heat resistant material, such as polytetrafluoroethylene (PTFE) or other elastomeric material. The top 14 of the probe is connected to an electronic control unit which includes a power source and communicates with a monitoring device that displays a reading of the level of the liquid in the bubbler.

EXAMPLE 1

Figure 3:
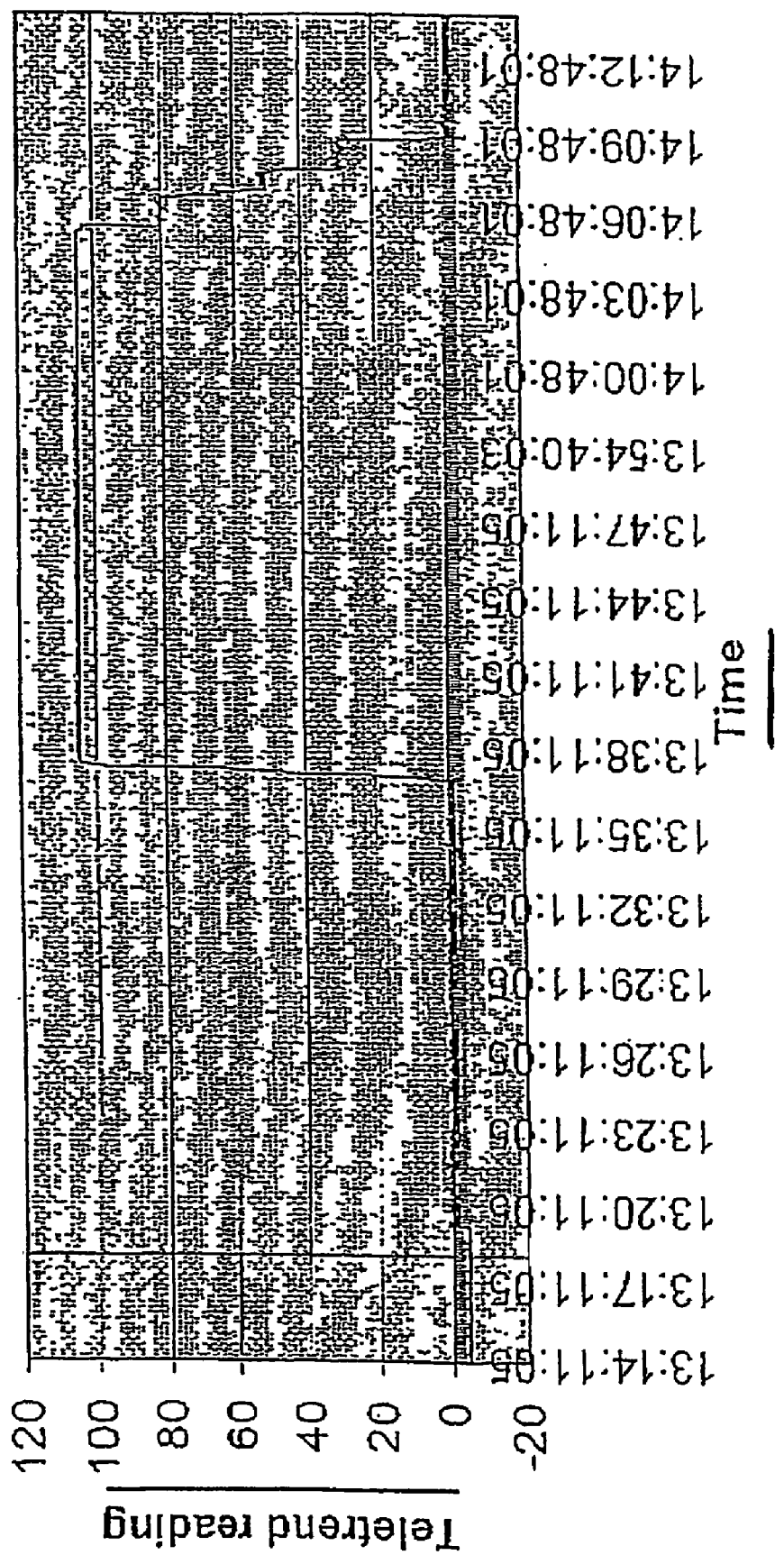
FIG. 3 is a graph showing the changing level of TMG in a bubbler with time measured using the apparatus shown in FIGS. 1 and 2.

An investigation was carried out to demonstrate the ability of an apparatus according to the first embodiment of the present invention to continuously monitor the level of trimethylgallium (TMG) in a bubbler. A probe as hereinbefore described was sealed within a bubbler and the monitor was zeroed when the bubbler was empty. The bubbler was then filled with TMG (ca. 180 g=157 ml) and the readings set to a maximum. The material was then pushed out of the bubbler through the dip leg and into a receiver. The reading level on the Teletrend™ was continuously recorded. The recording showed that as the material was removed the reading went from 100% to 0%, as illustrated in FIG. 3 of the accompanying drawings. The steepness of the slope of the graph was dependent upon the rate of material removal. Once all the material had been removed, the system was checked by dropping more material into the bubbler wherein the reading rose from 0% back to 100%.

EXAMPLE 2

Figure 4:
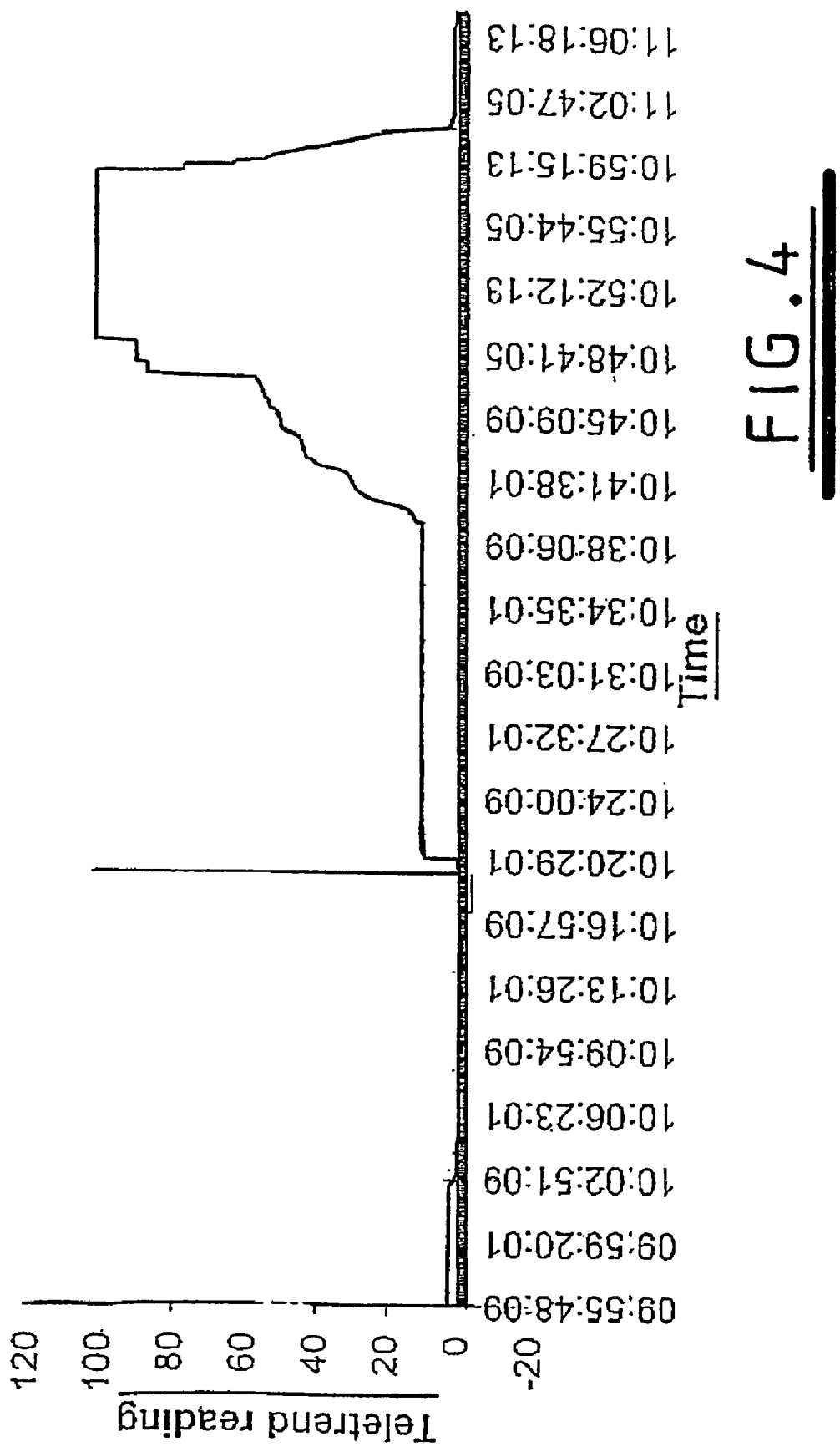
FIG. 4 is a graph showing the changing level of TMA in a bubbler with time measured using the apparatus shown in FIGS. 1 and 2.

An investigation was carried out to demonstrate the ability of an apparatus according to the first embodiment of the present invention to continuously monitor the level of trimethylaluminium (TMA) in a bubbler. The monitor connected to the probe was zeroed when the bubbler was empty as described above in relation to Example 1. It was then filled with TMA (ca. 120 g=160 ml) and the readings set to a maximum. The material was then pushed out of the bubbler through the dip leg and into a receiver. The reading level on the Teletrend™ was recorded. The recording demonstrated that as the material was removed the reading went from 100% to 0%, as illustrated in FIG. 4 of the accompanying drawings. The steepness of the slope was dependent upon the rate of material removal.

Figure 6:
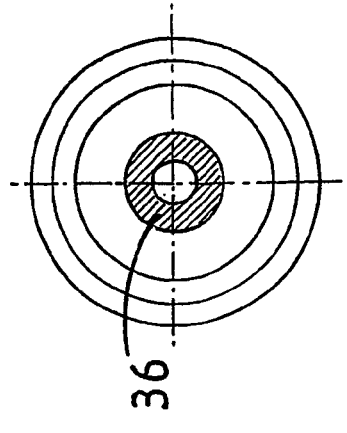
FIG. 6 is a transverse cross section of the probe shown in FIG. 5.
Figure 5:
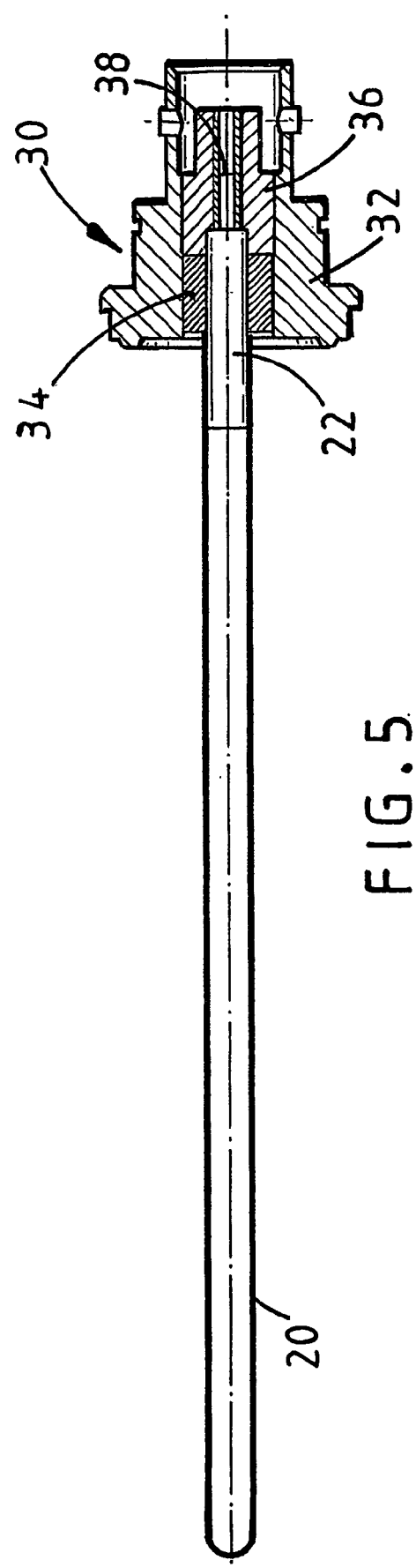
FIG. 5 is a longitudinal cross section of a probe according to another embodiment of the present invention.

FIGS. 5 and 6 of the accompanying drawing illustrate a probe according to a second embodiment of the present invention. The probe is shown prior to insertion into a vessel, such as a bubbler. The probe comprises a hollow stainless steel elongated tube 20 which is sealed within a mounting 30. The end section 22 of the tube that is to be sealed within the mounting is made of a nickel alloy, such as that sold under the trade name Inconel X-750™ which is typically 70% nickel ($Ni^a$). Inconel X-750 alloy is similar in characteristics to Inconel 600™ but is made precipitation harden-able by additions of aluminum and titanium. The end section 22 is hermetically sealed to a glass material 34.

Inconel 600™ is a nickel-chromium-iron alloy which has high resistance to heat and corrosion. The high nickel content gives the alloy resistance to corrosion by many organic and inorganic compounds and makes it virtually immune to chloride-ion stress corrosion cracking. Chromium confers resistance to sulphur compounds and provides resistance to oxidising conditions at high temperatures or in corrosive solutions. It also has excellent resistance to corrosion by high-purity water. The Inconel X-750 alloy has good resistance to oxidation along with a high tensile strength and creep rupture properties at temperatures to about 1300° F. (700° C.).

The Inconel X-750 section 22 of the probe is provided with a glass-to-metal matched seal which relies on an oxide layer to form the metal to glass seal. Glass and metal with similar coefficients of thermal expansion are chosen to ensure minimal stresses are introduced into the glass during the fusion operation. Inconel, or alternatively Kovar™ steels are best fused with borosilicate glass to provide the matched seals.

The body 32 of the mounting 30 that receives the section of the probe body that has a glass-to-metal hermetic seal is also made of a nickel alloy, for example Inconel X-750 alloy. The mounting incorporates a ½ inch Swagelok® VCR profile at the connecting face and internal profiles to suit the fit of a BNC connector and the glass-to-metal hermetic seal. The VCR is a high integrity, high purity metal gasket face seal fitting. The gasket is deformed by raised cross-section of fitting on tightening to provide a secure metal-metal seal. A BNC insulating surround 36, for example of a polyether ether ketone material (PEEK) is positioned together with the electrode mating 38 to the top of the section 22.

EXAMPLE 3

Figure 7:
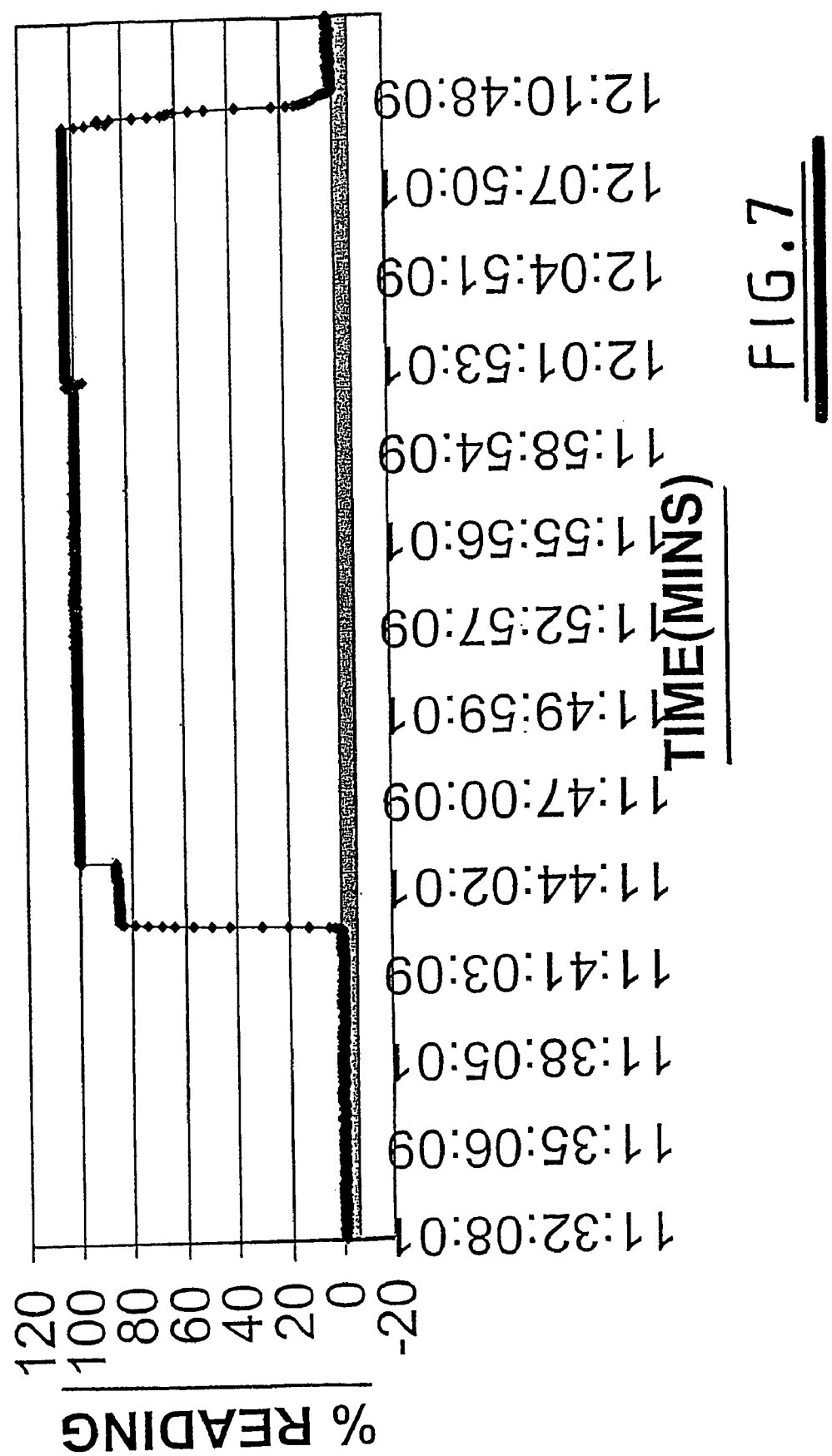
FIG. 7 is a graph showing the changing level of TMA in a bubbler with time using the probe shown in FIGS. 5 and 6.

An investigation was carried out to demonstrate the ability of an apparatus according to the second embodiment of the present invention to continuously monitor the level of TMA in a bubbler. The results shown in FIG. 7 indicate the fill of TMA into the bubbler, a calibration step to read 100% full and an emptying back to 0%. Note that the liquid was pumped in and out of the bubbler using a positive pressure allowing a rapid change in level to be achieved.

EXAMPLE 4

Figure 8:
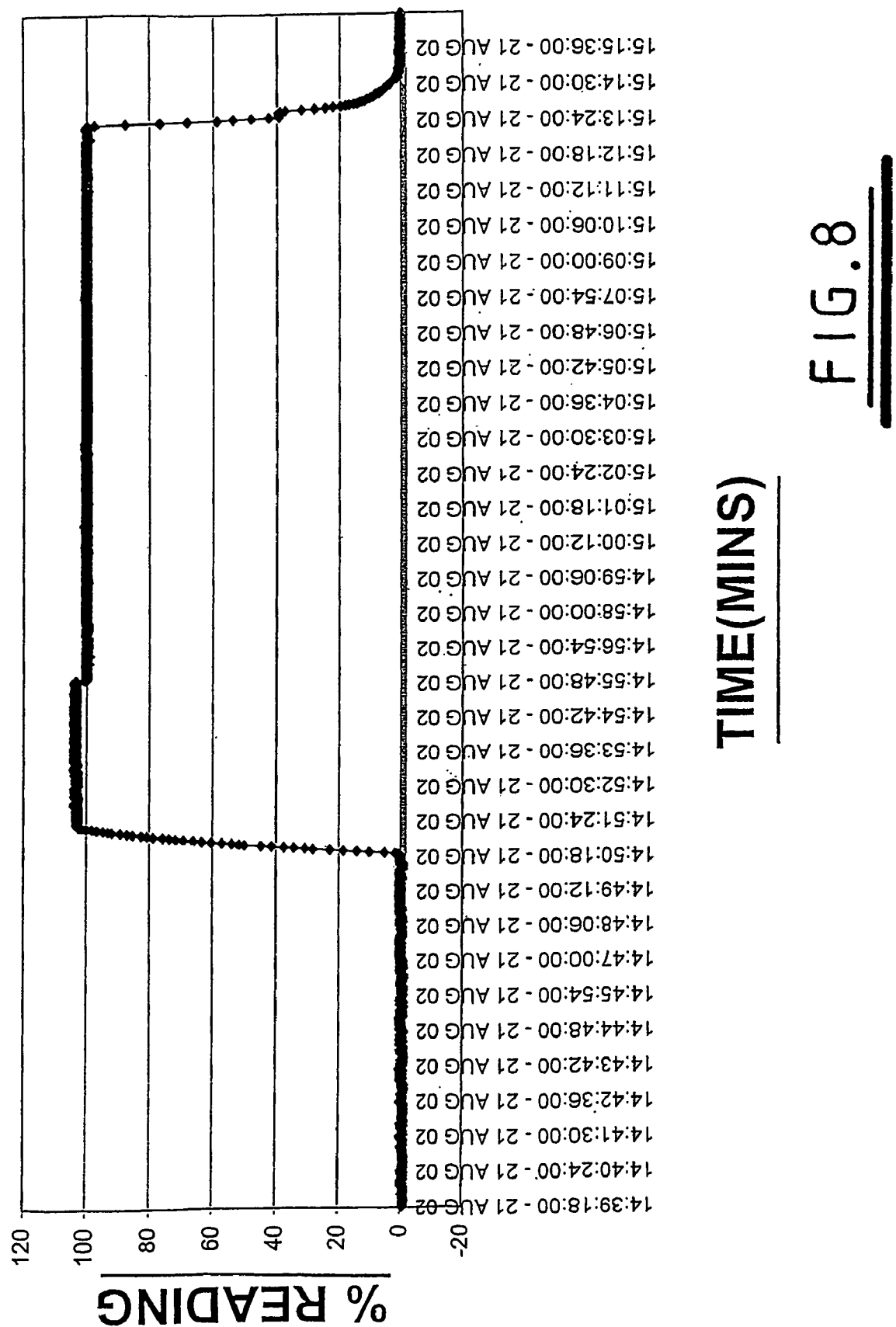
FIG. 8 is a graph showing the changing level of TMG in a bubbler with time using the probe shown in FIGS. 5 and 6.

A further investigation was carried out to demonstrate the ability of an apparatus according to the second embodiment of the present invention to continuously monitor the level of TMG in a bubbler. The process was the same as that described in relation to Example 3 but the calibration step moves the reading down from 100% rather than up as in Example 3. The results are shown in FIG. 8.

The results obtained in relation to Examples 3 and 4 indicate a continuous level monitoring has been achieved in the bubbler by the provision of a bubbler supplied with a probe according to the second embodiment of the present invention. A fast response time is achieved as shown by the steep gradient of the graphs on fill and emptying.

The present invention provides a measuring probe that is suitable for monitoring the level of materials in a bubbler that is robust and compatible with the organometallic compounds that are contained within the vessel. This enables the level of organometallic compounds in individual bubblers to be continuously monitored and allows customers to know when to order more material as the level of material in the bubbler is used up. This also ensures maximum utilisation of the source material within the bubbler. The glass haematic seal that connects the probe to the port of the bubbler ensures that the pressure within the vessel is retained and that the contents of the vessel, which are extremely air sensitive, remain isolated from air.

Additionally, the seal is resistant to high temperatures and does not interfere with the measurement of the level or with the content of the vessel. The elastomeric material which may coat the probe assists in providing total inertness to ensure that the purity of the precursor is maintained. Furthermore, the probe is less fragile than the glass probes previously provided. This is important because of rough transport handling. It is essential that the probes should not break since, due to the nature of the products inside the bubbler, any breakage could lead to a leak and possibly fire.

The sealing of the probe into a mounting to provide a leak tight join to a vessel, in particular a bubbler body, thus creating an ultrahigh purity, high integrity, robust container suitable for placing organometallic precursors in, has never before been achieved. The sealed unit has been shown to withstand high pressure and be shock resistant on dropping and does not contaminate the products in any way even at ppm impurity levels. This is essential for a probe that is to continuously indicate organometallic precursor levels in a stainless steel high integrity supply vessel (bubbler). No such probes are currently available that meet the required specifications of inertness, robustness, simplicity, reliability and accuracy. Furthermore, the provision of a capacitance that is formed as an integral part of a cap or mounting unit wherein the unit has the electrical connections for the probe, has not previously been described.

The invention claimed is:

1. A bubbler comprising:
a metallic vessel having an outer wall and an internal cavity, the metal vessel constituting a first electrode;
an outlet extending through the outer wall of the vessel, the outlet being adapted and configured to allow gas to pass from the internal cavity of the vessel to an environment external to the vessel;
a conduit extending through the outer wall of the vessel and into the internal cavity of the vessel, the conduit being adapted and configured to allow a gas to be pumped into the internal cavity of the vessel;
at least one metallic probe, the probe having a sealing end from which the probe extends within the internal cavity of the vessel, and at least a portion of the probe within the internal cavity of the vessel constituting a second electrode, the sealing end of the probe being hermetically sealed to the vessel via a metal-to-glass-to-metal seal, at least a portion of the probe within the internal cavity of the vessel being devoid of any glass extending therearound, the first and second electrodes being spaced from each other in a manner such that the first and second electrodes together form part of a capacitor;
a power source operatively connected to the capacitor; and
a capacitance meter operatively connected to the capacitor.

2. A bubbler as claimed in claim 1 wherein the probe comprises stainless steel.

3. A bubbler as claimed in claim 1 wherein the metal-to-glass-to-metal seal comprises a borosilicate glass material.

4. A bubbler as claimed in claim 1 wherein the outer wall of the vessel comprises a top half and a bottom half and the vessel comprises a port extending through the top half of the outer wall, and wherein the metal-to-glass-to-metal seal hermetically seals the port.

5. A bubbler as claimed in claim 4 wherein the metal-to-glass-to-metal seal comprises a mounting member having a metal gasket face, the metal gasket face forming a metal-to-metal hermetic seal with the port of the outer wall of the vessel.

6. A bubbler as claimed in claim 5 wherein the mounting comprises at least one electrical connection that operatively connects the power source and the capacitance meter to the probe.

7. A bubbler as claimed in claim 5 wherein at least a portion of the mounting member is formed of a nickel alloy.

8. A bubbler as claimed in claim 7 wherein the nickel alloy consists essentially of at most 0.08 percent carbon, at most 0.35 percent manganese, at most 0.015 percent phosphorus, at most 0.015 percent sulfur, at most 0.35 percent silicon, from 14.0 to 17.0 percent chromium, approximately 70.0 percent nickel, at most 0.50 percent copper, from 5.0 to 9.0 percent iron, from 0.4 to 1.0 percent aluminum, from 2.25 to 2.75 percent titanium, from 0.7 to 1.2 percent of niobium and tantalum combined, and at most 1.0 percent cobalt, all percentages being percentages by weight.

9. A bubbler as claimed in claim 1 wherein the probe comprises a coating of an elastomeric material over the portion of the probe within the internal cavity of the vessel that is devoid of any glass extending therearound.

10. A bubbler as claimed in claim 1 wherein the metal-to-glass-to-metal seal comprises a portion of the probe that is formed of a nickel alloy.

11. A bubbler as claimed in claim 10 wherein the nickel alloy consist of one of first and second materials, the first material consisting essentially of at most 0.01 percent carbon, at most 2.5 percent cobalt, from 14.5 to 16.5 percent chromium, from 4.0 to 7.0 percent iron, at most 1.0 percent manganese, from 15.0 to 17.0 percent molybdenum, at most 0.04 percent phosphorus, at most 0.03 percent sulfur, at most 0.08 percent silicon, at most 0.35 percent vanadium, and the remainder being nickel, the second material consisting essentially of at most 0.02 percent carbon, approximately 17.0 percent cobalt, approximately 0.3 percent manganese, approximately 29.0 percent nickel, approximately 0.2 percent silicon, and the remainder being iron, all percentages being percentages by weight.

12. A bubbler as claimed in claim 10 wherein the nickel alloy contains at least one of aluminum and titanium.

13. A bubbler as claimed in claim 12 wherein the nickel alloy consists essentially of at most 0.08 percent carbon, at most 0.35 percent manganese, at most 0.015 percent phosphorus, at most 0.015 percent sulfur, at most 0.35 percent silicon, from 14.0 to 17.0 percent chromium, approximately 70.0 percent nickel, at most 0.50 percent copper, from 5.0 to 9.0 percent iron, from 0.4 to 1.0 percent aluminum, from 2.25 to 2.75 percent titanium, from 0.7 to 1.2 percent of niobium and tantalum combined, and at most 1.0 percent cobalt, all percentages being percentages by weight.

14. A bubbler as claimed in claim 1 further comprising a recorder operatively connected to the capacitance meter.

15. A bubbler as claimed in claim 14 wherein the bubbler further comprises a display device and is adapted and configured to display a level of liquid in the vessel via the display device.

16. A bubbler as claimed in claim 1 wherein the apparatus is configured and adapted to correlate capacitance measurements made by the capacitance meter to volumes of liquid within the vessel.

17. A bubbler as claimed in claim 1 wherein the bubbler is configured and adapted to monitor a level of organometallic compounds.

18. A method of monitoring the level of an organometallic compound in a vessel, the method comprising the steps of inserting at least one metallic probe having a sealing end into a vessel in a manner such that the metallic probe acts as a first electrode and such that the sealing end of the probe is encased in a glass material, hermetically sealing the sealing end of the probe within the vessel via a metal-to-glass-to-metal seal wherein the glass material encasing the sealing end of the probe constitutes the glass in the metal-to-glass-to-metal seal, providing a second electrode in a manner such that the first and second electrodes form a capacitor, and applying an electric current to the capacitor and monitoring capacitance of the capacitor.

\* \* \* \* \*